US006820315B1

(12) United States Patent
Hans et al.

(10) Patent No.: US 6,820,315 B1
(45) Date of Patent: Nov. 23, 2004

(54) ASSEMBLY DEVICE FOR ASSEMBLING AND DISMANTLING A FUEL INJECTION VALVE

(75) Inventors: Waldemar Hans, Bamberg (DE); Mathias Linssen, Litzendorf (DE); Christof Vogel, Bischberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,290

(22) PCT Filed: Sep. 30, 1999

(86) PCT No.: PCT/DE99/03143

§ 371 (c)(1), (2), (4) Date: Nov. 9, 2000

(87) PCT Pub. No.: WO00/36295

PCT Pub. Date: Jun. 22, 2000

(30) Foreign Application Priority Data

Dec. 14, 1998 (DE) ........................................ 198 57 485

(51) Int. Cl.$^{7}$ ................................................ B23P 19/04
(52) U.S. Cl. ........................................... 29/263; 29/255
(58) Field of Search .......................... 29/263, 256, 282, 29/255, 272, 280, 278

(56) References Cited

U.S. PATENT DOCUMENTS

| | | | | | |
|---|---|---|---|---|---|
| 451,898 | A | * | 5/1891 | McMaster | 213/205 |
| D256,544 | S | * | 8/1980 | Hintze | D8/51 |
| 4,561,159 | A | | 12/1985 | Schuster | |
| 4,970,771 | A | * | 11/1990 | Wood | 29/263 |
| 5,604,967 | A | * | 2/1997 | McMahon | 29/263 |
| 5,727,298 | A | * | 3/1998 | Strong | 29/259 |

* cited by examiner

*Primary Examiner*—Lee D. Wilson
(74) *Attorney, Agent, or Firm*—Kenyon & Kenyon

(57) ABSTRACT

An assembling device for assembling and disassembling a fuel injector in a mounting hole of a cylinder head of an internal combustion engine has a jacket body at least partially surrounding the fuel injector. A contact section, on which both a hold-down force for holding down the fuel injector in the mounting hole and a disassembling force for disassembling the fuel injector can be exerted on the fuel injector, and a collar section protruding from the mounting hole are formed on the jacket body. The collar section has at least one thread, in which a disassembling screw can be screwed in so that when the disassembling screw is tightened it abuts on the cylinder head and transmits a disassembling force on the collar section so that the assembling device (1) with the fuel injector (3) inserted into the assembling device (1) is extracted.

8 Claims, 2 Drawing Sheets

ASSEMBLY DEVICE FOR ASSEMBLING AND DISMANTLING A FUEL INJECTION VALVE

FIELD OF THE INVENTION

The present invention relates to an assembling device for assembling and disassembling a fuel injector, for example a high-pressure direct injector, into and from a mounting hole in a cylinder head of an internal combustion engine. Fuel is injected directly into the combustion chamber of the internal combustion engine through this high-pressure direct injector.

BACKGROUND INFORMATION

An assembling device having a jacket body at least partially surrounding the fuel injector is described in German Patent Application No. 197 05 990. A collar section directed inward is formed at a first end of the jacket body, and a collar section directed outward is formed at a second end of the jacket body, opposite the first end. While the collar section directed radially inward can be inserted into a groove of the fuel injection valve, she collar section directed outward protrudes outward from the mounting hole of the fuel injection valve. An appropriate tool, for example, an assembling iron, can engage in the collar section protruding from the mounting hole of the cylinder head in order to lift the assembling device together with the fuel injection valve from the mounting hole. In some cases considerable disassembling forces are required because the fuel injection valves of the fuel injectors may seize in their mounting holes. Therefore the cylinder head, which may be made of light metal, for example, may be disadvantageously damaged by the mounting iron or other lifting tools. Which is disadvantageous. Furthermore, it is a disadvantage in the case of the conventional assembling device that the mounting device transmits no hold-down force to the fuel injector during the operation of the internal combustion engine, but the fuel injector and the assembling device are held in the mounting hole disadvantageously by friction forces alone.

U.S. Pat. No. 4,561,159 describes a disassembling device for a diesel injector. An end area of the fuel injector opposite the spray orifice can be inserted at the side into a slit in the disassembling device. The disassembling device is not inserted into the mounting bore of the cylinder head and it does not remain in the mounting bore when assembled. The disassembling device described in U.S. Pat. No. 4,561,159 is instead a tool extension which is attached to the fuel injector before disassembling the fuel injector. No hold-down force is transmitted to the fuel injector. Connecting the disassembling device to the fuel injector is a relatively complicated process.

SUMMARY

The assembling device according to the present invention has the advantage over the conventional device that the at least one disassembling screw engaging in a thread of the collar section allows simple and damage-free disassembling of the fuel injector inserted into the assembling device. Disassembling takes place so that the assembling device with the fuel injector is continuously extracted from the mounting hole by tightening the at least one disassembling screw or advantageously plurality of disassembling screws.

The threads, each assigned to a disassembling screw, peripherally distributed on the collar section, for example two threads for two disassembling screws, can ensure that the disassembling force resulting from the tightening of the plurality of disassembling screws is directed axially, so that increased friction lock due to a radial force component is avoided. A symmetric, continuous pulling force is achieved through the simultaneous tightening of the disassembling screws. As an alternative, disassembling can also be performed by tightening the plurality of disassembling screws alternately.

It is particularly advantageous that openings, for example in the form of bore holes, are provided on the collar section, through which assembling screws engage a thread of the cylinder head. By tightening these assembling screws, sufficient hold-down force is transmitted to the assembling device and thus to the fuel injector to hold down the fuel injector against the combustion pressure prevailing in the combustion chamber during the operation of the internal combustion engine. The threads and the openings in the collar section are dimensioned, for example so that the assembling screws can be used as disassembling screws at the same time. For this purpose, the threads in the cylinder head and the collar section of the assembling device must have the same diameter and the same taper, and the openings must be dimensioned so that the corresponding screw diameters pass through them. When the fuel injector is disassembled, the mounting screws are loosened first and then the mounting screws used as disassembling screws are introduced in the thread of the collar section and tightened, whereby the assembling device with the fuel injector is extracted of the mounting hole in the cylinder head. No special disassembling screws need to be provided.

For example at least three openings spaced at an angular distance of 90°, are provided for the mounting screws. This ensures that the hold-down force on the assembling device and thus on the fuel injector is applied uniformly over the periphery.

According to a advantageous embodiment, the contact section of the assembling device engaging the fuel injector has an extension directed radially inward and an axial extension extending axially beyond the radial extension. The axial extension is used for transmitting the hold-down force to the fuel injector, while the radial extension engages a groove of the fuel injector to transmit the disassembling force to the fuel injector. The functions of hold-down and disassembling are separated on the contact section of the assembling device engaging the fuel injector. This has the advantage that the area of the disassembling groove of the fuel injector can be implemented by an injected plastic piece, and the area of the fuel injector engaged by the axial extension must be made of metal. This results in simple and cost-effective manufacturing of the fuel injector housing.

The assembling device can be economically manufactured by deep drawing from sheet metal.

DETAILED DESCRIPTION

Figure 1:
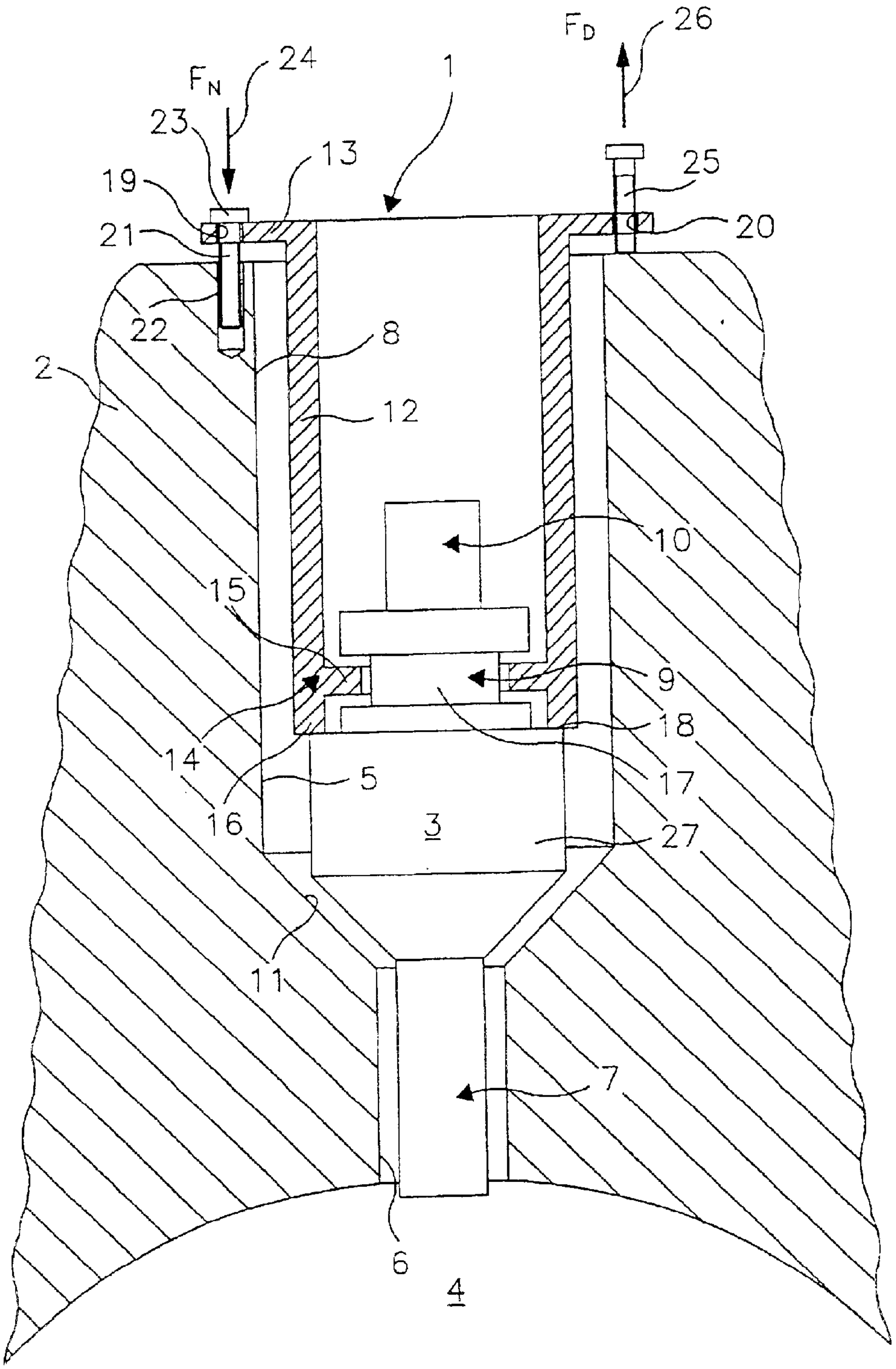
FIG. 1 shows a section through a cylinder head of an internal combustion engine, a first embodiment of an assembling device according to the present invention, and a fuel injector inserted into the assembling device.

FIG. 1 shows a section through a cylinder head 2 of an internal combustion engine, an embodiment of assembling device 1 according to the present invention, and fuel injector 3 shown unsectioned, inserted into assembling device 1 according to the present invention.

Fuel injector 3 is used for direct injection of fuel into a combustion chamber 4 of the internal combustion engine. Cylinder head 2 has a mounting hole 5 to accommodate fuel injector 3, which in the embodiment illustrated is divided into a narrow section 6 to accommodate an injection section 7 of fuel injector 3, a widened section 8 to accommodate a disassembling section 9, a fuel feed section 10 and a housing body 27 leading into a conical section 11 connecting widened section 8 to narrow section 6.

Assembling device 1 according to the present invention has a jacket body 12, which at least partially surrounds fuel injector 3; a collar section 13 directed outward from mounting hole 5 and extending radially outward from jacket body 12, is formed on jacket body 12. A contact section 14 is formed at the end opposite collar section 13 of jacket body 12, through which assembling device 1 engages with fuel injector 3.

Contact section 14 has an extension 15 directed radially inward and an axial extension 16 extending axially beyond radial extension 15. Radial extension 15 engages in a disassembling groove 17 of fuel injector 3, in order to transmit a disassembling force to fuel injector 3. Axial extension 16 engages in a hold-down surface 18 of fuel injector 3 in order to transmit a hold-down force to fuel injector 3.

At least one, however, advantageously a plurality of unthreaded openings 19 and at least one, however, advantageously a plurality of threaded opening 20 are provided with threads 20 on collar section 13 of assembling device 1. Openings 19 are designed in this embodiment as unthreaded boreholes, traversed by assembling screws 21, which can be screwed into threaded boreholes 22 of cylinder head 2. Openings 19 may be also designed as elongated holes, slots, recesses opening outward, or the like, for example.

Threads 20 are formed, for example, in threaded holes, with thread 20 being cut directly into collar section 13. It is, however, also possible to attach threaded bushings or nuts to collar section 13 of assembling device 1.

When fuel injector 3 is assembled, fuel injector 3 is initially inserted into assembling device 1 so that radial extension 15 engages in disassembling groove 17 of fuel injector 3. Then assembling device 1, together with fuel injector 3, is inserted into mounting hole 5 of cylinder head 2. Finally, assembling screws 21 are inserted through openings 19 in collar section 13 and screwed into threads 22 of cylinder head 2. Screw heads 23 of assembling screws 21 contact collar section 13 when assembling screws 21 are tightened and exert a hold-down force $F_N$ indicated by arrow 24 on assembling device 1, which is transmitted via axial extension 16 to hold-down surface 18 of fuel injector 3. Thus, fuel injector 3 is held down in mounting hole 5 against the combustion pressure in combustion chamber 5 during the operation of the internal combustion engine.

In order to disassemble fuel injector 3 and assembling device 1, assembling screws 21 are initially loosened and removed from thread 22 of cylinder head 2. Then disassembling screws 25 are inserted into thread 22 of collar section 13, abutting on cylinder head 2. A disassembling force FD, indicated by arrow 26, is then exerted on assembling device 1; this force is transmitted to disassembling groove 17 of fuel injector 3 via radial extension 15. Thus assembling device 1, together with fuel injector 3 is extracted from mounting hole 5 of cylinder head 2 without need for an assembling iron or another lifting tool. Relatively large disassembling forces F, can be exerted on assembling device 1 and fuel injector 3 via disassembling screws 25, so that fuel injector 3 can be reliably removed to be serviced or replaced even if fuel injector 3 has become seized in mounting hole 5.

Due to the fact that both a radial extension 15 and an axial extension 16 are formed on contact section 14 of assembling device 1, the hold-down and disassembling functions are separated from one another. While housing body 27 of fuel injector 3 on which hold-down surface 18 is formed is made, for example, of metal, for example steel, in order to enable it to transmit a high hold-down force to fuel injector 3, disassembling section 9 of fuel injector, on which disassembling groove 17 is formed, can be manufactured as an injected plastic piece, since disassembling force $F_D$ is considerably less than hold-down force $F_N$. This allows fuel injector 3 to be manufactured inexpensively.

Figure 2:
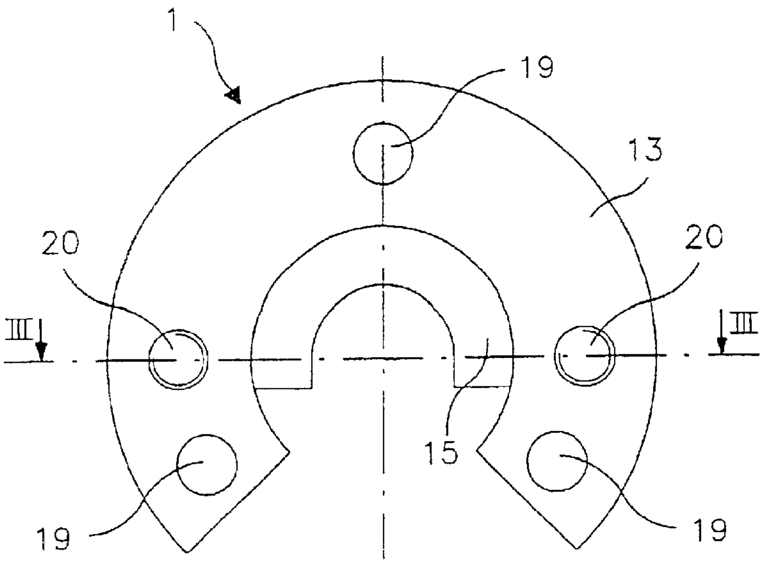
FIG. 2 shows a top view of a second embodiment of an assembling device that is slightly modified with respect to the first embodiment shown in FIG. 1.

FIG. 2 shows the top view of an embodiment slightly modified in comparison to that shown in FIG. 1 of an assembling device 1 according to the present invention. Radial extension 15, collar section 13, thread 20 formed on collar section 13, and openings 19 designed as unthreaded bore holes on collar section 13 can be seen. The modification with respect to the embodiment illustrated in FIG. 1 is that two threads formed in the threaded bore holes on collar section 13 are diametrically opposite in section plane III—III, while in the embodiment illustrated in FIG. 1, one thread 20 and one unthreaded opening 19 are arranged in section plane III—III to better illustrate the present invention.

While both threads 20 on collar section 13 are arranged diametrically opposite one another, three unthreaded openings 19 on collar section 13 are peripherically distributed almost uniformly so that the angular spacing between the individual openings is at least 90°, for example 120°. Thus a peripherally uniform hold-down force can be transmitted to fuel injector 3 via assembling device 1 according to the present invention.

As can also be seen from FIG. 2, in the embodiment illustrated in FIG. 2, radial extension 15 surrounds fuel injector 3 not illustrated in FIG. 2 in a smaller angular area than jacket body 12 and/or collar section 13 formed on jacket body 12. This facilitates insertion of fuel injector 3 into assembling device 1.

Figure 3:
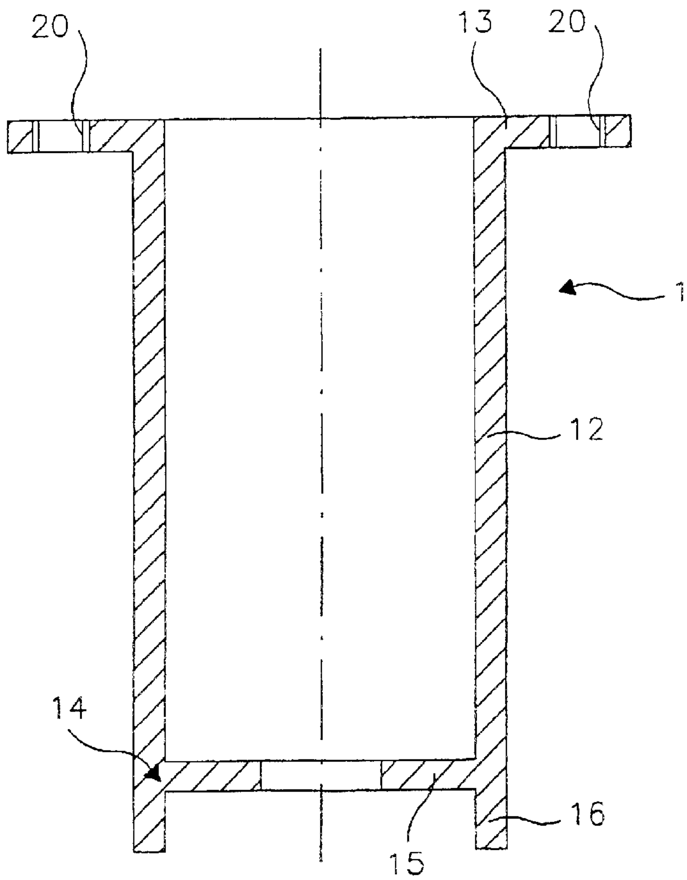
FIG. 3 shows a section along line III—III of FIG. 2.

FIG. 3 shows a section along line III—III in FIG. 2. The illustration largely corresponds to the illustration of assembling device 1 of FIG. 1 with the difference that, as explained previously, two threads 20 are arranged instead of one thread 20 and one unthreaded opening 19.

Assembling device 1 according to the present invention can be manufactured economically as a deep-drawn sheet metal part. Threads 22 on cylinder head 2 and threads 20 on collar 13 of assembling device 1 have the same diameter and the same taper, so that assembling screws 21 can be used as disassembling screws 25 at the same time. Therefore, in order to disassemble assembling device 1 and fuel injector 3, assembling screws 21 are first loosened and removed and then inserted into threads 20 and tightened.

Using assembling device 1 according to the present invention, high symmetric disassembling forces directed axially can be transmitted to fuel injector 3, preventing damage to cylinder head 2 made of light metal, for example.

The present invention is not restricted to the embodiments presented. For example, radial extension 15 may also be implemented via notches on jacket body 12 that are bent so that they protrude radially inward.

What is claimed is:

1. An assembling device for assembling and disassembling a fuel injector in a mounting hole of a cylinder head of an internal combustion engine, the assembling device comprising:

a jacket body having a contact section and a collar section, the jacket body at least partially surrounding the fuel injector, a hold-down force for holding down the fuel injector in the mounting hole and a disassembling force for disassembling the fuel injector being able to be exerted on the fuel injector via the contact section, the collar section protruding from the mounting hole, the collar section having at least one thread into which a disassembling screw can be screwed and at least one opening in which an assembling screw can be inserted so that the assembling screw engages a thread provided in the cylinder head, wherein:

when the disassembling screw is tightened, the disassembling screw abuts the cylinder head and transmits a disassembling force to the collar section so that the assembling device with the fuel injector inserted into the assembling device is extracted from the mounting hole, a hold-down force is transmitted to the collar section by tightening the assembling screw, the hold-down force being such that the assembling device with the fuel injector inserted into the assembling device is held down in the mounting hole, and the at least one thread and the at least one opening are dimensioned so that the assembling screw can be used as a disassembling screw.

2. The device according to claim 1, wherein:

a plurality of peripherally distributed threads are arranged on the collar section, each of the peripherally distributed threads corresponding to a disassembling screw.

3. The device according to claim 2, wherein:

two threads of the plurality of peripherally distributed threads are arranged on the collar section diametrically opposite one another, each of the two threads corresponding to a disassembling screw.

4. The device according to claim 1, wherein:

a plurality of peripherally distributed openings is arranged on the collar section, each of the plurality of peripherally distributed openings corresponding to an assembling screw.

5. The device according to claim 1, wherein:

the contact section has a radial extension directed inward and an axial extension extending axially over the radial extension, the axial extension transmitting the hold-down force to the fuel injector, the radial extension engaging a disassembling groove of the fuel injector in order to transmit a disassembling force to the fuel injector.

6. The device according to claim 5, wherein:

the radial extension surrounds the fuel injector in a smaller angular area than at least one of the jacket body and the collar section.

7. The device according to claim 1, wherein:

the jacket body includes a deeply drawn metal.

8. An assembling device for assembling and disassembling a fuel injector in a mounting hole of a cylinder head of an internal combustion engine, the assembling device comprising:

a jacket body having a contact section and a collar section, the jacket body at least partially surrounding the fuel injector, a hold-down force for holding down the fuel injector in the mounting hole and a disassembling force for disassembling the fuel injector being able to be exerted on the fuel injector via the contact section, the collar section protruding from the mounting hole, the collar section having at least one thread into which a disassembling screw can be screwed and at least one opening in which an assembling screw can be inserted so that the assembling screw engages a thread provided in the cylinder head, wherein;

when the disassembling screw is tightened, the disassembling screw abuts the cylinder head and transmits a disassembling force to the collar section so that the assembling device with the fuel injector inserted into the assembling device is extracted from the mounting hole, a hold-down force is transmitted to the collar section by tightening the assembling screw, the hold-down force being such that the assembling device with the fuel injector inserted into the assembling device is held down in the mounting hole, and a plurality of peripherally distributed openings is arranged on the collar section, each of the plurality of peripherally distributed openings corresponding to an assembling screw, and three openings are arranged on the collar section at an angular distance of greater than 90 from one another, the three openings being bore holes, each of the three openings corresponding to an assembling screw.

* * * * *

UNITED STATES PATENT AND TRADEMARK OFFICE

CERTIFICATE OF CORRECTION

PATENT NO. : 6,820,315 B1 
DATED : November 23, 2004
INVENTOR(S) : Waldemar Hans et al.

It is certified that error appears in the above-identified patent and that said Letters Patent is hereby corrected as shown below:

Title page,
Item [57], ABSTRACT,
Line 14, delete "(1)(3)"
Line 15, delete "(1)"

Signed and Sealed this

Twelfth Day of July, 2005

JON W. DUDAS
*Director of the United States Patent and Trademark Office*